(12) United States Patent
Franzen et al.

(10) Patent No.: US 12,164,645 B2
(45) Date of Patent: Dec. 10, 2024

(54) VULNERABILITY DASHBOARD AND AUTOMATED REMEDIATION

(71) Applicant: Capital One Services, LLC, McLean, VA (US)

(72) Inventors: Krystan R. Franzen, Mechanicsville, VA (US); Mohamed Seck, Aubrey, TX (US)

(73) Assignee: Capital One Services, LLC, McLean, VA (US)

( * ) Notice: Subject to any disclaimer, the term of this patent is extended or adjusted under 35 U.S.C. 154(b) by 779 days.

(21) Appl. No.: 17/144,889

(22) Filed: Jan. 8, 2021

(65) Prior Publication Data

US 2022/0222350 A1    Jul. 14, 2022

(51) Int. Cl.
*G06F 21/57* (2013.01)
*G06F 9/54* (2006.01)
*G06F 11/07* (2006.01)
*G06N 20/00* (2019.01)

(52) U.S. Cl.
CPC ............ *G06F 21/577* (2013.01); *G06F 9/547* (2013.01); *G06F 11/0793* (2013.01); *G06N 20/00* (2019.01)

(58) Field of Classification Search
CPC .... G06F 21/577; G06F 9/547; G06F 11/0793; G06N 20/00
See application file for complete search history.

(56) References Cited

U.S. PATENT DOCUMENTS

| | | | |
|---|---|---|---|
| 11,159,557 B2 * | 10/2021 | Vester | G06F 8/65 |
| 11,556,815 B1 * | 1/2023 | Stave | G06N 20/20 |
| 2003/0126472 A1 * | 7/2003 | Banzhof | G06F 21/577 726/25 |
| 2015/0355895 A1 * | 12/2015 | Giammaria | G06F 11/3688 717/169 |
| 2019/0342323 A1 * | 11/2019 | Henderson | G06F 16/285 |

(Continued)

OTHER PUBLICATIONS

Seaman, J., "Cometh the Year, Month, Day, Hour," pp. 467-489 in PCI DSS: An Integrated Data Security Standard Guide (2020).

(Continued)

*Primary Examiner* — Luu T Pham
*Assistant Examiner* — Paul J Skwierawski
(74) *Attorney, Agent, or Firm* — Harrity & Harrity, LLP

(57) ABSTRACT

In some aspects, a system may receive security vulnerability indicators associated with one or more cloud-based applications and/or properties associated with one or more cloud-based images used to create cloud instances. The system may determine, for each indicator and/or property, a corresponding remediation recommendation. The system may generate a graphical user interface that provides the indicators and/or properties with the corresponding remediation recommendations. The system may transmit, based on a user setting, a corresponding message for each indicator and/or property. The system may trigger, based on at least one of the indicators and/or properties, an automated remediation script that instructs a cloud environment to perform an action for a cloud-based application and/or image associated with the at least one indicator and/or property. The system may transmit one or more status indicators associated with the automated remediation script. Numerous other aspects are described.

20 Claims, 13 Drawing Sheets

(56) References Cited

U.S. PATENT DOCUMENTS

2020/0236129 A1* 7/2020 Barkovic ............. H04L 43/045
2021/0234889 A1* 7/2021 Burle ................. H04L 63/1433

OTHER PUBLICATIONS

Kuo, C. et al., "The Study of a Risk Assessment System based on PageRank," Journal of Internet Technology, vol. 20, pp. 2255-2264 (2019).

* cited by examiner

240

241a

| | | EC2 Complaint | | | | |
|---|---|---|---|---|---|---|
| Account | Division | Dev Owner | ASV | Region | Instance | Tagging & AMI Compliant |
| horizontal-dev | HR | Gray, Todd | ASV1 | us-east-1 | instance1 | true |
| horizontal-dev | HR | Gray, Todd | ASV1 | us-east-1 | instance2 | true |
| horizontal-dev | HR | Gray, Todd | ASV1 | us-east-1 | instance3 | true |
| horizontal-dev | HR | Gray, Todd | ASV1 | us-west-2 | instance4 | true |

241b

| | | Lambda Compliant ⌄ | | | | |
|---|---|---|---|---|---|---|
| Account | Division | Dev Owner | ASV | Region | Function Name | Tagging & VPC Compliant |
| horizontal-dev | HR | Gray, Todd | ASV1 | us-east-1 | function1 | true |
| horizontal-dev | HR | Gray, Todd | ASV1 | us-east-1 | function2 | true |
| horizontal-dev | HR | Gray, Todd | ASV1 | us-east-1 | function3 | true |
| horizontal-dev | HR | Gray, Todd | ASV1 | us-east-1 | function4 | true |

241c

| | | ALB Compliant | | | | |
|---|---|---|---|---|---|---|
| Account | Division | Dev Owner | ASV | Region | ALB Name | Cipher & Tagging Compliant |
| horizontal-dev | HR | Gray, Todd | ASV1 | us-east-1 | alb1 | true |
| horizontal-dev | HR | Gray, Todd | ASV1 | us-east-1 | alb2 | true |
| horizontal-dev | HR | Gray, Todd | ASV1 | us-east-1 | alb3 | true |
| horizontal-dev | HR | Gray, Todd | ASV1 | us-east-1 | alb4 | true |

FIG. 2E

VULNERABILITY DASHBOARD AND AUTOMATED REMEDIATION

BACKGROUND

Security vulnerabilities may arise when cloud-based operating systems or other applications are due for security patches or other software updates. Similarly, vulnerabilities may arise when cloud-based images (that may, for example, be used to create cloud instances) are not refreshed (e.g., by having instances based on those images rebooted, rehydrated, or otherwise reestablished).

SUMMARY

In some implementations, a system for a dashboard display of, and automated communications and remediation for, security vulnerabilities includes one or more memories and one or more processors, communicatively coupled to the one or more memories, configured to receive, from a database that stores information regarding security vulnerabilities, security vulnerability indicators associated with one or more cloud-based applications; determine, for each security vulnerability indicator, a corresponding remediation recommendation; generate a graphical user interface (GUI) for display, wherein the GUI provides the security vulnerability indicators with corresponding remediation recommendations; transmit, based on a user setting and via one or more communication interfaces, a corresponding message for each security vulnerability indicator; trigger, for at least one of the security vulnerability indicators, an automated remediation script based on a corresponding one of the remediation recommendations, wherein the automated remediation script instructs a cloud environment to perform an action for a cloud-based application associated with the at least one of the security vulnerability indicators; and transmit, via the one or more communication interfaces, one or more status indicators associated with the automated remediation script.

In some implementations, a method of generating a dashboard display of, and automated communications and remediation for, security vulnerabilities includes receiving, from a cloud environment, properties associated with one or more cloud-based images used to create cloud instances; determining, for each property, a corresponding remediation recommendation; generating a GUI for display, wherein the GUI provides the properties with the corresponding remediation recommendations; transmitting, based on a user setting and via one or more communication interfaces, a corresponding message for each property; triggering, based on at least one of the properties, an automated remediation script, wherein the automated remediation script instructs the cloud environment to perform an action for a cloud-based image associated with the at least one of the properties; and transmitting, via the one or more communication interfaces, one or more status indicators associated with the automated remediation script.

In some implementations, a non-transitory computer-readable medium storing a set of instructions for generating GUIs about, and transmitting automated communications for, security vulnerabilities includes one or more instructions that, when executed by one or more processors of a device, cause the device to receive, from a database that stores information regarding security vulnerabilities, security vulnerability indicators associated with one or more cloud-based applications; determine, for each security vulnerability indicator, a corresponding remediation recommendation; generate a first GUI for display, wherein the first GUI provides the security vulnerability indicators grouped by corresponding severity level using spatial separation, color indicators, or a combination thereof; transmit, based on a user setting and via one or more communication interfaces, a corresponding message for each security vulnerability indicator; receive, based on interaction with the first GUI, a request to provide more details about a subset of the security vulnerability indicators; and generate a second GUI for display based on the request, wherein the second GUI provides the security vulnerability indicators with corresponding remediation recommendations.

BRIEF DESCRIPTION OF THE DRAWINGS

FIGS. 2A, 2B, 2C, 2D, 2E, and 2F are diagrams of example graphical user interfaces (GUIs) generated by systems and/or methods described herein.

DETAILED DESCRIPTION

Figure 1A:
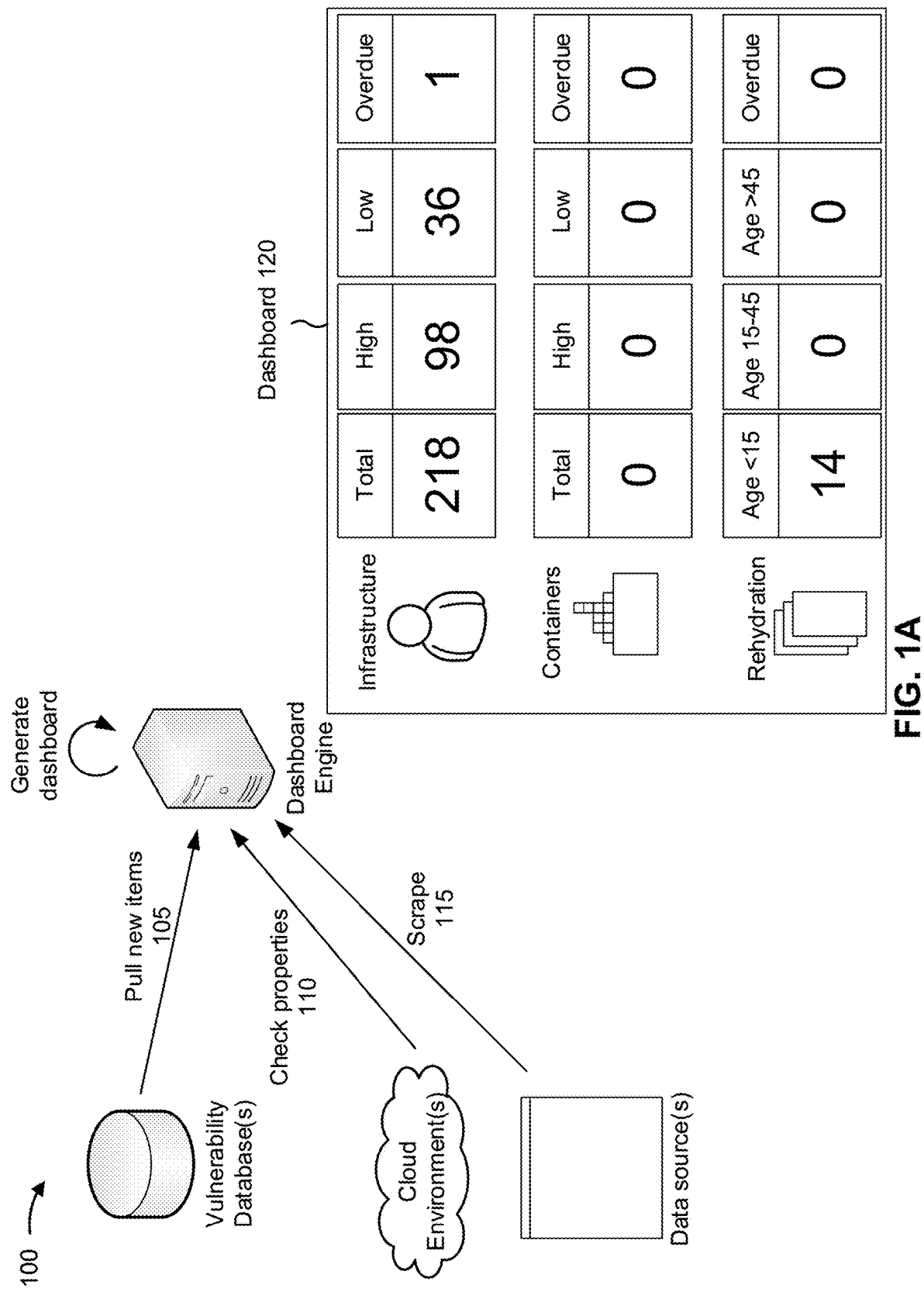
FIGS. 1A, 1B, and 1C are diagrams of an example implementation relating to a dashboard display of, and automated communications and remediation for, security vulnerabilities.

The following detailed description of example implementations refers to the accompanying drawings. The same reference numbers in different drawings may identify the same or similar elements.

In some cloud environments, application services (ASVs) or other cloud-based applications may exhibit security vulnerabilities. For example, vulnerabilities may arise when cloud-based operating systems or other applications are due for security patches or other software updates. Similarly, cloud-based images (used, for example, to create instances) generally should be refreshed periodically (e.g., by having instances based on those images rebooted, rehydrated, or otherwise reestablished). When images are not refreshed, they may be referred to as "stale" and may be more susceptible to cyberattacks.

Technical administrators may collect information regarding vulnerabilities from ASVs as well as properties (such as age) about cloud-based images from corresponding cloud environments. However, these administrators may be required to communicate the vulnerabilities and the properties to users, who can then authorize security patches or other software updates and can refresh the cloud-based images. Some techniques for alerting users include non-intuitive interfaces that are text-based.

Providing a dashboard that uses spatial separation and/or color indicators to quickly and visually inform users improves user experience, and the users are more likely to perform remediation. Some implementations described herein enable generation of a dashboard that may include a first screen with high-level information about the vulnerabilities and the properties. The users may obtain more information by interacting with the first screen to generate a second screen with more detailed information. As a result, the dashboard is more likely to capture attention from the users and increase the efficiency of remediation procedures undertaken by the users.

Additionally, the administrators generally must trigger communications about the vulnerabilities and the properties to the users. Some automated techniques may generate these communications according to one or more rules. However, some users give more attention to certain communication channels over others, and some users are more likely to engage with frequent communications while other users are less likely to engage with frequent communications.

By providing communications according to preferred channels and customized schedules, user experience is improved, and the users are more likely to perform remediation. Some implementations described herein enable a dashboard to communicate to some users via emails and to other users via a chat service (such as Slack®, Teams®, or another chat service). Additionally, some implementations described herein enable the dashboard to communicate with one user according to a schedule configured by that user and communicate with another user according to a different schedule configured by that user. As a result, the communications are more likely to capture attention from the users.

Furthermore, many remediations are simple, such as authorizing a patch or other update or refreshing a cloud-based image. Performing these remediations automatically reduces delays between detection of the vulnerabilities and the properties and corresponding remediation procedures, thereby improving security within a corresponding cloud environment. Some implementations described herein enable automated remediation of vulnerable cloud-based applications and stale cloud-based images. As a result, the cloud environment is more secure.

Figure 1B:
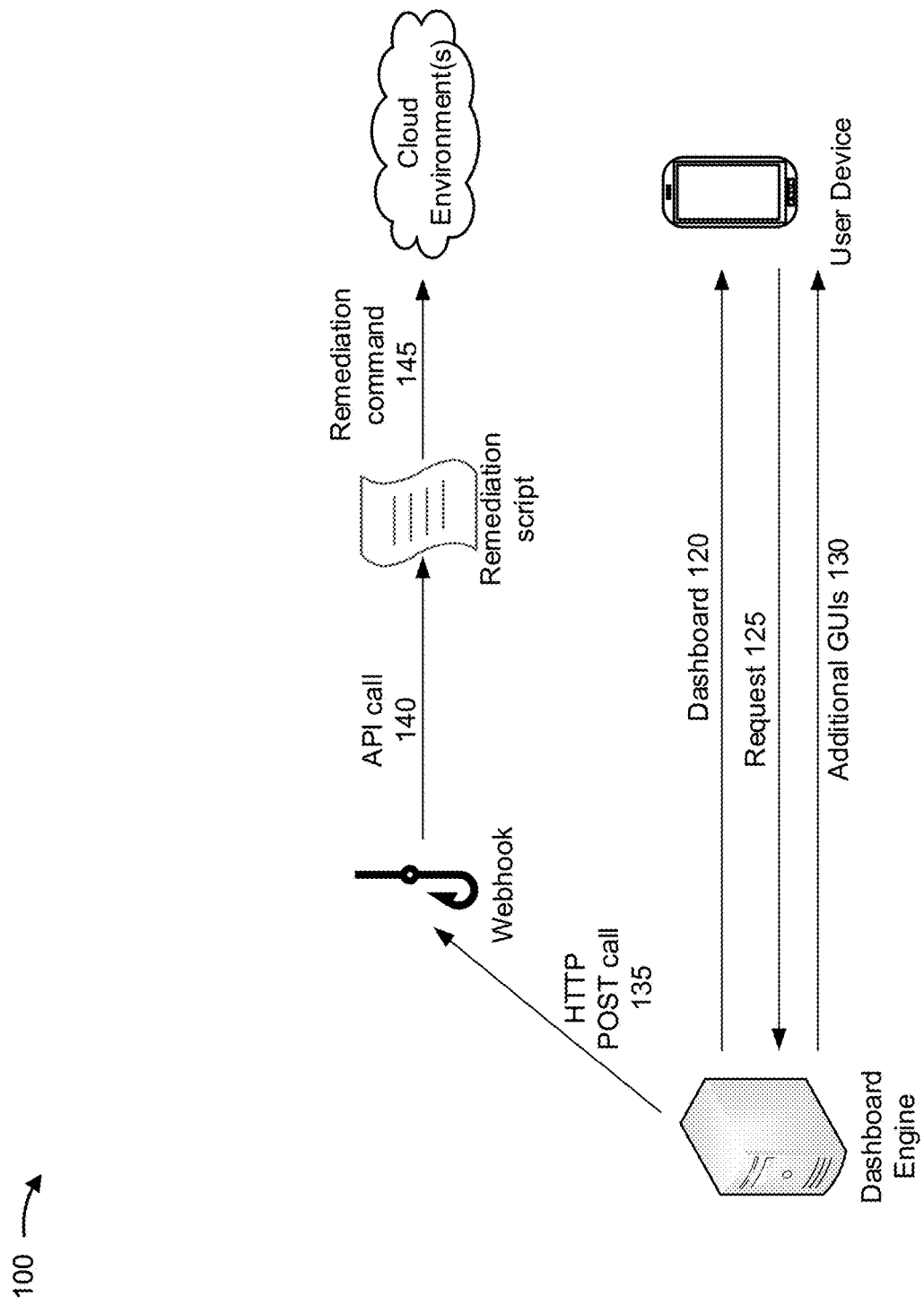
Figure 1C:
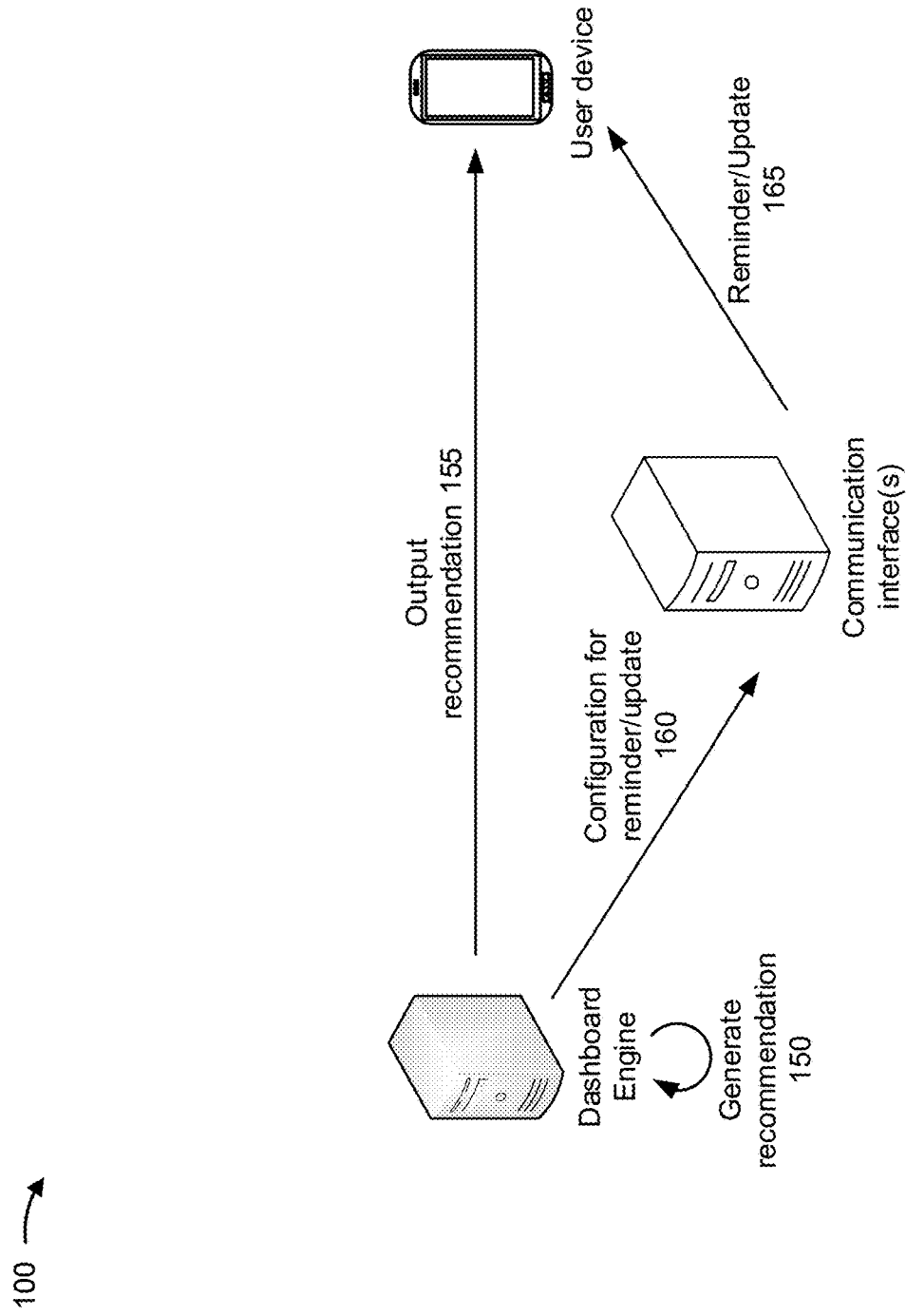

FIGS. 1A-1C are diagrams of an example 100 associated with a dashboard display of, and automated communications and remediation for, security vulnerabilities. As shown in FIGS. 1A-1C, example 100 includes one or more vulnerability databases, one or more cloud environments, one or more data sources, a dashboard engine, a user device, and one or more communication platforms. These devices are described in more detail in connection with FIGS. 4 and 5.

As shown by reference number 105, the dashboard engine may receive, from a database that stores information regarding security vulnerabilities, security vulnerability indicators associated with one or more cloud-based applications. For example, the database may include an on-site database and/or a remote database storing the information. In some implementations, the database may be relational, such that the security vulnerability indicators are stored in association (e.g., via rows and/or columns) with identifiers of the cloud-based applications. As another example, the database may be graphical, such that nodes representing the cloud-based applications are connected (e.g., via edges) to nodes representing the security vulnerability indicators. In some implementations, the database that stores information regarding security vulnerabilities may receive the information automatically (e.g., as output from one or more ASVs) and/or manually (e.g., entered by one or more administrators associated with the cloud-based applications).

In some implementations, the security vulnerability indicators may indicate a required patch and/or other software update, a missing firewall or other network security software, missing anti-virus and/or other anti-malware software, subpar encryption keys and/or other encryption protocols, out-of-date hardware drivers, and/or other vulnerabilities associated with the cloud-based applications.

Additionally, or alternatively, and as shown by reference number 110, the dashboard engine may receive, from a cloud environment (e.g., one or more Amazon Web Services® (AWS®) servers, one or more Amazon Virtual Private Cloud® (VPC) servers, one or more Microsoft Azure® servers, and/or one or more servers associated with one or more other cloud environments), properties associated with one or more cloud-based images (e.g., Amazon® Machine Images (AMIs) and/or other cloud-based images) used to create cloud instances. For example, the dashboard engine may call one or more application programming interfaces (APIs) to obtain the properties. The APIs may be provided by the cloud environment. Additionally, or alternatively, the cloud environment may output the properties to the dashboard engine (e.g., according to a schedule).

In some implementations, the properties may include ages associated with the cloud-based images, a number of instances associated with each cloud-based image, instance types associated with each cloud-based image, a backing device associated with each cloud-based instance (e.g., backed by an elastic block store (EBS), backed by an instance store volume, such as an Amazon S3® bucket, and/or another backing device), and/or other properties associated with the cloud-based images.

As shown by reference number 115, the dashboard engine may additionally receive, from one or more data sources, one or more news articles associated with the security vulnerability indicators. For example, the dashboard engine may scrape one or more servers that host one or more news websites to obtain the news articles. The dashboard engine may save the web pages (e.g., one or more hypertext markup language (HTML) files and/or with supporting files, such as image files, cascading style sheet (CSS) files, and/or other website-related files), extract text and/or supporting images from the web pages, or otherwise store the news articles. Additionally, or alternatively, the dashboard engine may receive the news articles from the servers (e.g., according to a schedule). In some implementations, the dashboard engine may receive a universal resource locator (URL) and/or another indicator for each news article.

As shown by reference number 120, the dashboard engine may generate a first GUI for display. In some implementations, the first GUI may provide the security vulnerability indicators grouped by corresponding severity level using spatial separation, color indicators, or a combination thereof. For example, as shown in FIG. 1A, the first GUI may provide a plurality of boxes that indicate the security vulnerability indicators grouped by corresponding severity levels (e.g., "Total," "High," "Low," and "Overdue" in example 100). The severity levels may include categories (e.g., as shown in FIG. 1A), numeric measures (such as percentages, severity scores, and/or other similar measures), or temporal measures (e.g., based on corresponding due dates for the security vulnerability indicators). In some implementations, the plurality of boxes may be colored differently. Additionally, or alternatively, the first GUI may provide the properties grouped by corresponding severity level using spatial separation, color indicators, or a combination thereof. For example, as shown in FIG. 1A, the first GUI may provide a plurality of boxes that indicate the properties grouped by corresponding severity levels (e.g., "Age<15," "Age 15-45," "Age>45," and "Overdue" in example 100). The severity levels may include categories (e.g., grade letters, category descriptors, and/or other similar categories), numeric measures (such as percentages, severity scores, and/or other similar measures), or temporal measures (e.g., as shown in FIG. 1A). In some implementations, the plurality of boxes may be colored differently.

As shown in FIG. 1B, and as further shown by reference number 120, the dashboard engine may output the first GUI for display on a user device (e.g., a smartphone, a tablet, a laptop, a desktop computer, and/or another similar device). For example, the dashboard engine may output the first GUI using a web interface (e.g., by the user device browsing to an intranet or Internet website that the dashboard engine uses to display the first GUI). Additionally, or alternatively, the user device may execute a mobile application (or "app") or a desktop application that communicates with the dashboard engine and generates the first GUI based on output from the dashboard engine.

As shown by reference number 125, the dashboard engine may receive, based on interaction with the first GUI, a request to provide more details about a subset of the security vulnerability indicators. For example, the interaction may include a left click, a right click, a double click, a tap on a touchscreen, a double tap, and/or another interaction with a portion of the first GUI. Additionally, or alternatively, the dashboard engine may receive, based on interaction with the first GUI, a request to provide more details about a subset of the properties. In some implementations, the interaction with the first GUI may include an interaction with one of the plurality of boxes. For example, a user may click or otherwise interact with the box associated with "High" security vulnerability indicators (as shown in FIG. 1A) in order to request more details about the subset of security vulnerability indicators that have a corresponding severity level of "High." In another example, a user may click or otherwise interact with the box associated with "Age 15-45" properties (as shown in FIG. 1A) in order to request more details about the subset of properties that have a corresponding age between 15 days and 45 days.

As shown by reference number 130, the dashboard engine may generate a second GUI for display based on the request. In some implementations, the second GUI may include timestamps associated with the security vulnerability indicators. For example, the second GUI may include one or more components shown in FIG. 2A. In some implementations, and as described above, the dashboard engine may further determine, for each security vulnerability indicator, a corresponding severity level. For example, the dashboard engine may receive the corresponding severity levels from the database along with the security vulnerability indicators (e.g., as described above in connection with reference number 105). Additionally, or alternatively, the dashboard engine may classify the security vulnerability indicators (e.g., using a lookup table, a machine learning model as described below in connection with FIG. 3, and/or another algorithm) to determine the corresponding severity levels. In some implementations, the second GUI may include the corresponding severity levels. Similarly, the dashboard engine may additionally or alternatively determine, for each property, a corresponding severity level. For example, the dashboard engine may receive the corresponding severity levels from the cloud environment along with the properties (e.g., as described above in connection with reference number 110). Additionally, or alternatively, the dashboard engine may classify the properties (e.g., using a lookup table, a machine learning model as described in connection with FIG. 3, and/or another algorithm) to determine the corresponding severity levels.

Additionally, in some implementations, the dashboard engine may further determine, for each security vulnerability indicator, a corresponding due date based on the corresponding severity level. For example, the dashboard engine may input the corresponding severity levels into a lookup table, a machine learning model as described in connection with FIG. 3, and/or another algorithm that outputs the corresponding due dates. Similarly, the dashboard engine may additionally or alternatively determine, for each property, a corresponding due date based on the corresponding severity level. In some implementations, the second GUI may further provide the security vulnerability indicators and/or the properties with the corresponding due dates.

In some implementations, the second GUI may additionally or alternatively provide corresponding remediation recommendations (e.g., as described below in connection with reference number 150). For example, the second GUI may include one or more components shown in FIG. 2B. Additionally, or alternatively, in some implementations, the second GUI may provide the one or more news articles (e.g., as described above in connection with reference number 115). For example, the second GUI may include one or more components shown in FIG. 2C.

Additionally, or alternatively, the second GUI may further provide at least one graph associated with the security vulnerability indicators and/or the properties grouped by corresponding severity levels. For example, the second GUI may include one or more components shown in FIG. 2D. Additionally, or alternatively, the dashboard engine may determine one or more corresponding compliance indicators based on one or more compliance rules. For example, the dashboard engine may verify whether one or more tags are present for the cloud-based images (referred to as "Tagging Compliant" in FIG. 2E); verify whether the cloud-based images satisfy one or more security requirements, such as encryption, firewalls, and/or other requirements (referred to as "AMI Compliant," "VPC Compliant," and/or "Cipher Compliant" in FIG. 2E); and/or otherwise verify that the cloud-based images satisfy one or more conditions. The dashboard engine may determine the compliance indicators by requesting compliance information (e.g., using one more APIs) and/or receiving compliance information (e.g., according to a schedule) from one or more ASVs and/or from the cloud environments (e.g., as described above in connection with reference numbers 105 and 110). Accordingly, the second GUI may include a table indicating the properties with the corresponding compliance indicators. For example, the second GUI may include one or more components shown in FIG. 2E.

As shown by reference numbers 135 and 140, the dashboard engine may trigger, for at least one of the security vulnerability indicators, an automated remediation script based on a corresponding remediation recommendation (e.g., as described below in connection with reference number 150). For example, as shown by reference number 135, the dashboard engine may transmit a hypertext transfer protocol (HTTP) POST call to a webhook based on the corresponding remediation recommendation. In some implementations, the webhook may be configured based on a user setting. For example, a user may configure the webhook using a GUI as shown in FIG. 2F. Accordingly, as shown by reference number 140, the webhook may call an API to trigger the automated remediation script. Similarly, the dashboard engine may additionally or alternatively trigger, based on at least one of the properties, an automated remediation script.

In some implementations, the dashboard engine may trigger the automated remediation script after receiving a confirmation based on an interaction with the second GUI or an interaction with a corresponding message (e.g., sent as described below in connection with reference number 160). For example, a user may click or otherwise interact with the second GUI and/or the corresponding message in order to authorize the dashboard engine to trigger the automated remediation script. In some implementations, the dashboard engine may determine whether the confirmation is required based on a user setting. For example, a stored setting associated with one user who is associated with one cloud-based application and/or cloud-based image may require confirmation before the dashboard engine can trigger an automated remediation script for that cloud-based application and/or cloud-based image. However, a different stored setting associated with another user who is associated with a different cloud-based application and/or cloud-based image may not require confirmation before the dashboard engine can trigger an automated remediation script for that cloud-based application and/or cloud-based image.

As shown by reference number 145, the automated remediation script may instruct a cloud environment to perform an action for a cloud-based application associated with the security vulnerability indicator. For example, the automated remediation script may trigger a patch and/or other software update to the cloud-based application. Additionally, or alternatively, the automated remediation script may instruct the cloud environment to perform an action for a cloud-based image associated with the property. For example, the automated remediation script may trigger a refresh (also referred to as a "reboot" or a "rehydration") of the cloud-based image.

In some implementations, the dashboard engine may further transmit, via one or more communication interfaces (e.g., as shown in FIG. 1C), one or more status indicators associated with the automated remediation script. For example, the communication interfaces may include an email server, a chat server, a server connected to a mobile network, and/or other similar infrastructure. In some implementations, the dashboard engine may transmit the status indicators using communication interfaces selected by a user. For example, a stored setting associated with one user who is associated with one cloud-based application and/or cloud-based image may indicate a first communication interface (e.g., a particular email server, chat service, mobile network, and/or other interface) to use to send status indicators for an automated remediation script executed for that cloud-based application and/or cloud-based image. However, a different stored setting associated with another user who is associated with a different cloud-based application and/or cloud-based image may indicate a second communication interface (e.g., a particular email server, chat service, mobile network, and/or other interface) to use to send status indicators for an automated remediation script executed for that cloud-based application and/or cloud-based image. In some implementations, the one or more status indicators may include one or more initialization indicators associated with triggering the automated remediation script and one or more completion indicators when the automated remediation script is finished. For example, a first email, chat, text message, phone call, and/or other communication may alert a user when the dashboard engine initiates the automated remediation script; one or more subsequent emails, chats, text messages, phone calls, and/or other communications may inform the user of a current step or other progress indicator associated with the automated remediation script; and a last email, chat, text message, phone call, and/or other communication may alert the user when the automated remediation script is finished executing.

As shown in FIG. 1C, and by reference number 150, the dashboard engine may determine, for each security vulnerability indicator, a corresponding remediation recommendation. For example, the dashboard engine may use a lookup table and/or another algorithm to determine the corresponding remediation recommendations. In some implementations, the dashboard engine may determine the corresponding remediation recommendation based on output from a remediation engine. The remediation engine may be a trained machine learning model (e.g., as described below in connection with FIG. 3).

In some implementations, the corresponding remediation recommendations may indicate a recommended patch and/or other software update to authorize, a recommended firewall or other network security software to install or activate, a recommended anti-virus and/or other anti-malware software to deploy, a recommended encryption key and/or other encryption protocol to use, a recommended update to a hardware driver, and/or other recommendations to remediate the corresponding security vulnerabilities.

Similarly, the dashboard engine may additionally or alternatively determine, for each property, a corresponding remediation recommendation. In some implementations, the corresponding remediation recommendations may indicate a recommended refresh for one or more of the cloud-based images, a recommended change to a backing device for one or more of the cloud-based images, and/or other recommendations to remediate the corresponding properties.

As shown by reference number 155, the dashboard engine may output the security vulnerability indicators with corresponding remediation recommendations. For example, as described above, the dashboard engine may provide the corresponding remediation recommendations in the second GUI (e.g., as shown in FIG. 2B).

As shown by reference number 160, the dashboard engine may transmit, based on a user setting and via one or more communication interfaces, a corresponding message for each security vulnerability indicator. In some implementations, the dashboard engine may determine, based on the user setting, the communication interfaces and communicate with one or more servers associated with the communication interfaces to transmit the corresponding message to the user. For example, a stored setting associated with one user who is associated with one cloud-based application may indicate a first communication interface (e.g., a particular email, chat service, phone number, and/or other interface) to use to send corresponding messages for security vulnerability indicators associated with that cloud-based application. However, a different stored setting associated with another user who is associated with a different cloud-based application may indicate a second communication interface (e.g., a particular email, chat service, phone number, and/or other interface) to use to send corresponding messages for security vulnerability indicators associated with that cloud-based application. Additionally, or alternatively, the dashboard engine may determine, based on the user setting, a schedule, and transmit the corresponding message according to the schedule. For example, a stored setting associated with one user who is associated with one cloud-based application may indicate a first schedule to use to send corresponding messages (e.g., how often (e.g., based on a periodicity and/or proximity to corresponding due dates) and/or how many corresponding messages) for security vulnerability indicators associated with that cloud-based application. However, a different stored setting associated with another user who is associated with a different cloud-based application may indicate a second schedule to use to send corresponding messages (e.g., how many corresponding messages and/or how often) for security vulnerability indicators associated with that cloud-based application.

Similarly, the dashboard engine may additionally or alternatively transmit a corresponding message for each property. In some implementations, the dashboard engine may transmit each corresponding message based on the corresponding property satisfying at least one condition. For example, the dashboard engine may send corresponding messages for properties that satisfy an age threshold, that satisfy a number of instances threshold, and/or another threshold. In some implementations, the condition may be based on the user setting. For example, a stored setting associated with one user who is associated with one cloud-based image may indicate a first condition (e.g., a particular age threshold, a number of instances threshold, and/or another condition) to use to send corresponding messages for properties associated with that cloud-based image. However, a different stored setting associated with another user who is associated with a different cloud-based application and/or cloud-based image may indicate a second condition (e.g., a particular age threshold, a number of instances threshold, and/or another condition) to use to send corresponding messages for properties associated with that cloud-based image.

As shown by reference number 165, the communication interfaces may forward the corresponding messages to user devices associated with those users.

In some implementations, the dashboard engine may receive, based on interaction with a third GUI, an indication of the one or more communication interfaces. For example, the third GUI may include one or more components shown in FIG. 2F. Additionally, or alternatively, the dashboard engine may receive, based on interaction with the third GUI, the user setting. As described above, the user setting may indicate a schedule and/or a condition for sending corresponding messages in addition to the communication interfaces.

By using the techniques described above, the dashboard engine can provide an improved interface related to security vulnerabilities and/or cloud properties. As a result, the user experience is improved with more efficient and accurate GUIs than provided by existing techniques. Additionally, in some implementations, the dashboard engine can customize communications for different users. As a result, the user experience is improved with more relevant and accurate communications than provided by existing techniques. Additionally, in some implementations and as described above, the dashboard engine may provide automated remediation for at least some security vulnerabilities and/or cloud properties. Accordingly, the dashboard engine may increase speed and efficiency of remediation procedures, resulting in more secure cloud environments.

As indicated above, FIGS. 1A-1C are provided as an example. Other examples may differ from what is described with regard to FIGS. 1A-1C.

FIGS. 2A-2F are diagrams of example GUIs generated by systems and/or methods described herein. For example, one or more components of the GUIs depicted in FIGS. 2A-2E may be provided in the second GUI described above in connection with FIGS. 1A-1C.

Figure 2A:
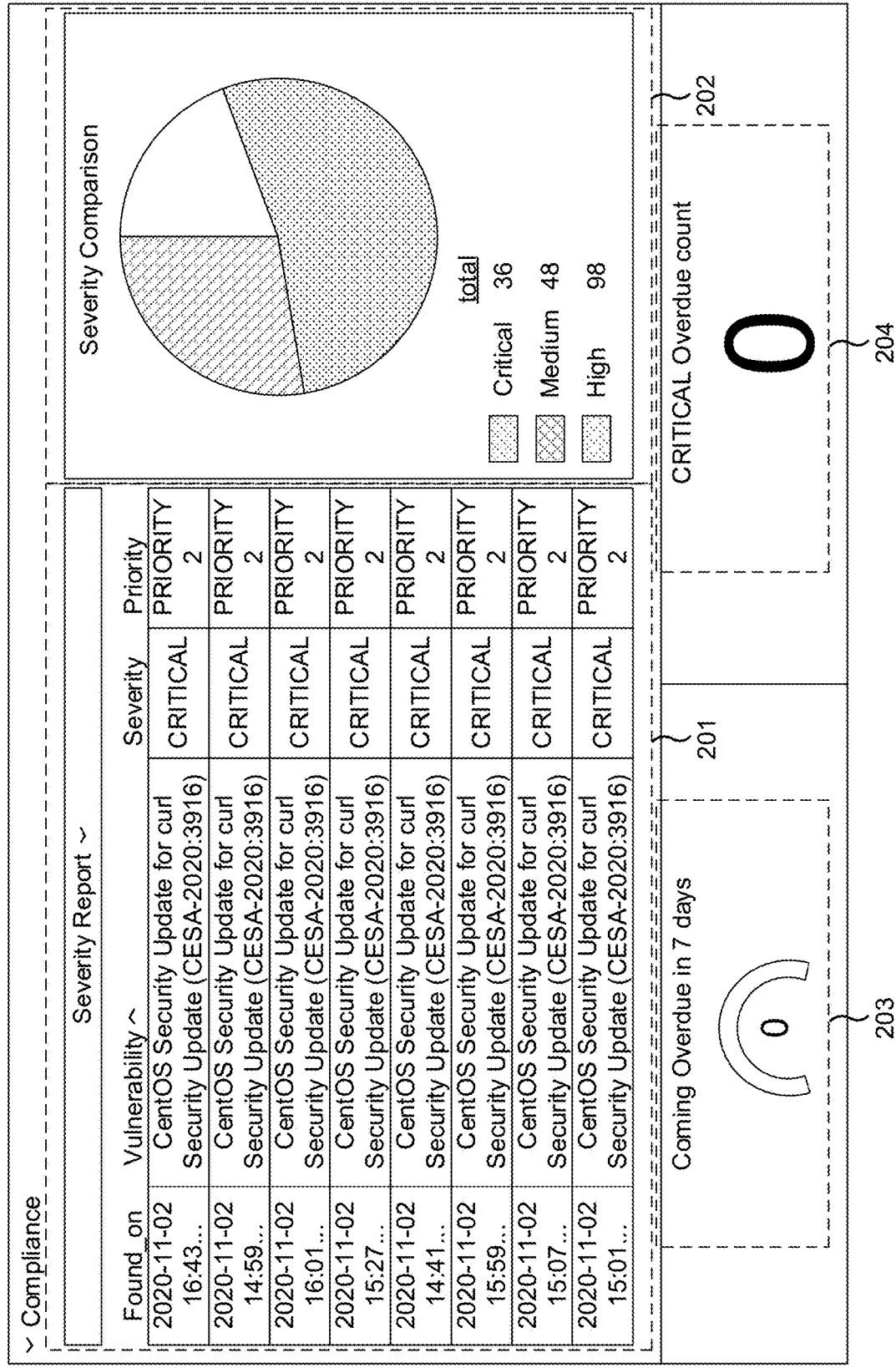
Figure 2B:
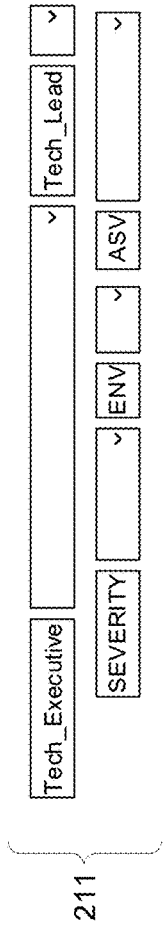
Figure 2B:
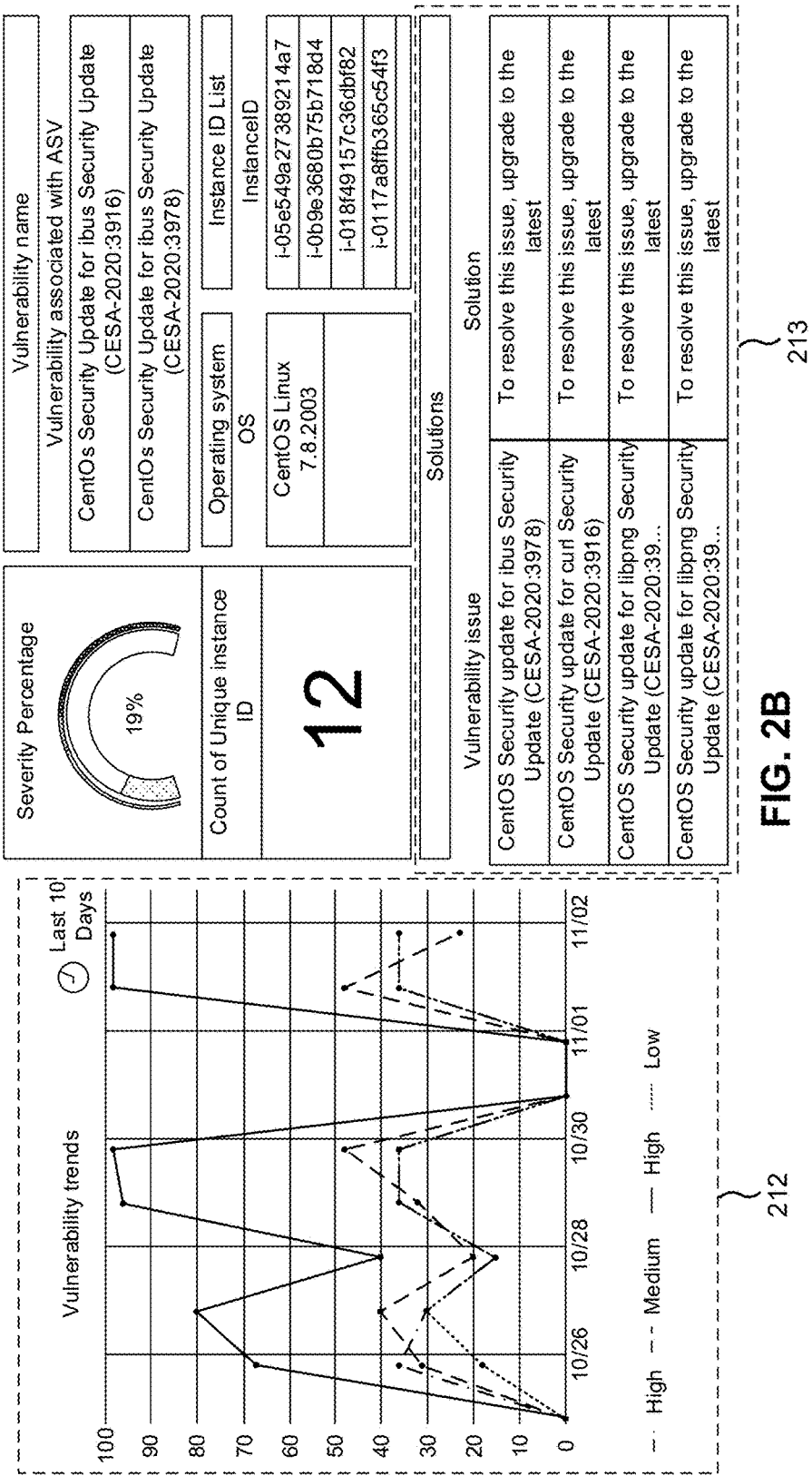

As shown in FIG. 2A, example 200 includes a table 201 providing security vulnerability indicators (shown as the "Vulnerability" column in example 200) with corresponding severity levels (shown as the "Severity" column in example 200). In some implementations, the table may further show corresponding priority levels (shown as the "Priority" column in example 200). The priority levels may be based on the severity levels (e.g., a "Priority 2" priority level corresponds to a "Critical" severity level in example 200). Additionally, or alternatively, the priority levels may further depend on vulnerability types associated with the security vulnerability indicators. Example 200 further includes a graph 202 providing the security vulnerability indicators with corresponding severity levels. Graph 202 includes a pie chart in example 200 but may additionally or alternatively include a line graph, a bar graph, and/or another graph. In some implementations, example 200 may further include information 203 associated with corresponding due dates for the security vulnerability indicators. Information 203 presents a quantity of the security vulnerability indicators with corresponding due dates that are past, but may additionally or alternatively present one or more quantities of the security vulnerability indicators with corresponding due dates that are within one or more thresholds of a current date (e.g., due within 7 days, due within 1 day, and/or due within a different period of time). Additionally, or alternatively, example 200 may further include information 204 associated with corresponding due dates and corresponding severity levels for the security vulnerability indicators. Information 204 presents a quantity of the security vulnerability indicators with a critical corresponding severity level and with corresponding due dates that are past, but may additionally or alternatively present one or more quantities of the security vulnerability indicators with corresponding due dates that are past and with other corresponding severity levels.

As shown in FIG. 2B, example 210 includes one or more filters 210 for viewing a subset of security vulnerability indicators. Filters 210 may determine the subset based on ASVs (e.g., selecting one or more ASVs associated with the subset), users (e.g., a "Tech_Executive" for the ASVs associated with the subset and/or a "Tech_Lead" for the ASVs associated with the subset), severity levels associated with the subset, a cloud environment associated with the subset ("ENV"), or other similar filters. In some implementations, example 210 may further include a graph 212 providing the subset of security vulnerability indicators with corresponding severity levels. Graph 212 in example 210 includes a line graph that shows the corresponding severity levels over time but may additionally or alternatively include a pie chart, a bar graph, and/or another graph. Additionally, or alternatively, example 210 may further include a table 213 providing the subset of security vulnerability indicators (shown as the "Vulnerability issue" column in example 210) with corresponding remediation recommendations (shown as the "Solution" column in example 210).

Figure 2C:

As shown in FIG. 2C, example 220 includes a table 221 of security vulnerability indicators (shown as the knowledge base (KB) title or "KB_Title" column in example 220). In some implementations, the table may further show timestamps associated with the security vulnerability indicators (shown as the "Time" column in example 220) and/or Internet protocol (IP) addresses associated with the security vulnerability indicators (shown as the "HOSTNAME" column in example 220). In some implementations, example 220 may further include a list 222 providing one or more news articles (e.g., scraped as described above in connection with FIGS. 1A-1C).

The second GUI described above in connection with FIGS. 1A-1C may include one or more components of example 200, example 210, and/or example 220. For example, the second GUI may include one or more of table 201, graph 202, information 203, information 204, graph 212, table 213, table 221, and/or list 222. In some implementations, the second GUI may provide filters 211 to select a subset of the security vulnerability indicators used to populate table 201, graph 202, information 203, information 204, graph 212, table 213, table 221, and/or list 222.

Figure 2D:
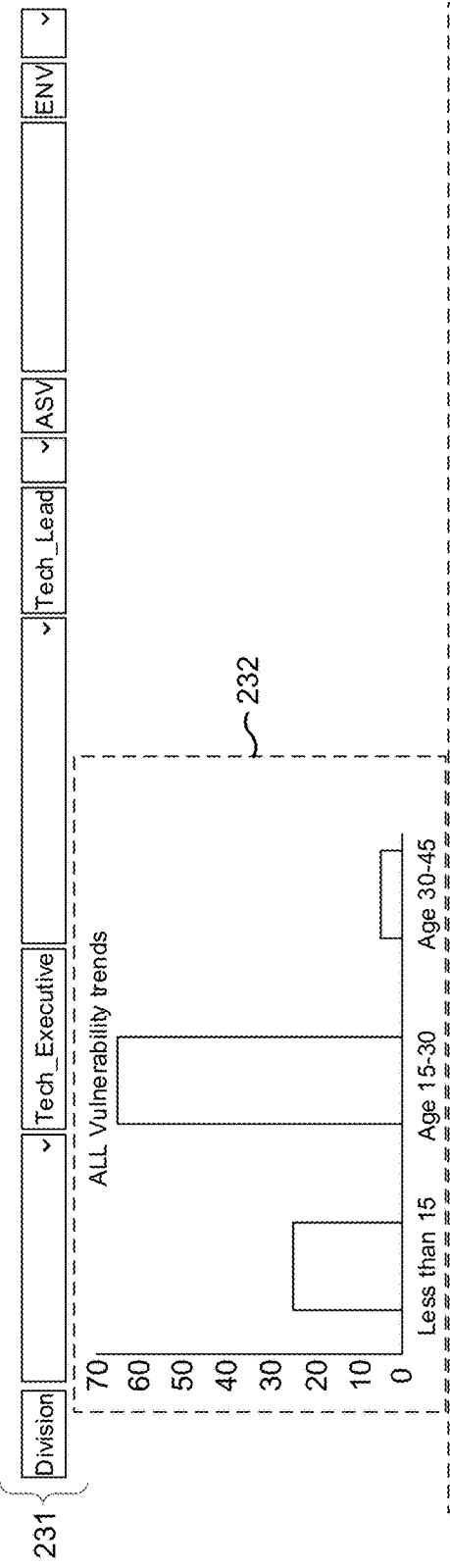
Figure 2F:

As shown in FIG. 2D, example 230 includes one or more filters 231 for viewing a subset of cloud-based images. Filters 231 may determine the subset based on ASVs (e.g., selecting one or more ASVs associated with the subset), users (e.g., a "Tech_Executive" for the ASVs associated with the subset and/or a "Tech_Lead" for the ASVs associated with the subset), a division associated with the subset (e.g., a division including users for the ASVs associated with the subset), a cloud environment associated with the subset ("ENV"), or other similar filters. In some implementations, example 230 may further include a graph 232 providing properties associated with the subset of cloud-based images along with corresponding severity levels. Graph 232 in example 230 includes a bar graph but may additionally or alternatively include a pie chart, a line graph, and/or another graph. Additionally, or alternatively, example 230 may further include one or more tables (e.g., tables 233a and 233b) providing the subset of cloud-based images (shown as the "asvName" column in example 230) grouped by corresponding properties (e.g., table 233a includes properties with age between 0 days and 15 days, and table 233b includes properties with age between 15 days and 30 days). In some implementations, tables 233a and 233b may further show timestamps associated with the cloud-based images (shown as the "Time" column in example 230), IP addresses associated with the cloud-based images (shown as the "ipAddress" column in example 230), identifiers associated with the cloud-based images (shown as the "instanceId" and "imageId" columns in example 230), users associated with the cloud-based images (shown as the "ownerContact" column in example 230), and/or regions associated with the cloud-based images (shown as the "region" column in example 230).

As shown in FIG. 2E, example 240 includes one or more tables (e.g., tables 241a, 241b, and 241c) of cloud-based images (shown as the "ASV" column in example 240) with corresponding compliance indicators (shown as the "Tagging & AMI Compliant," "Tagging & VPC Compliant," and "Cipher & Tagging Compliant" columns in example 240). In some implementations, the table may further show accounts associated with the cloud-based images (shown as the "Account" column in example 240), divisions associated with the cloud-based images (shown as the "Division" column in example 240), users associated with the cloud-based images (shown as the "Dev Owner" column in example 240), regions associated with the cloud-based images (shown as the "Region" column in example 240), and/or identifiers associated with the cloud-based images (shown as the "Instance," "Function Name," and application load balancer (ALB) name or "ALB Name" columns in example 240).

The second GUI described above in connection with FIGS. 1A-1C may include one or more components of example 230 and/or example 240. For example, the second GUI may include one or more of graph 232, tables 233a and 233b, and/or tables 241a, 241b, and 241c. In some implementations, the second GUI may provide filters 231 to select a subset of the cloud-based images used to populate graph 232, tables 233a and 233b, and/or tables 241a, 241b, and 241c.

As shown in FIG. 2F, example 250 includes first components 251 for configuring messages corresponding to security vulnerability indicators and/or properties for cloud-based images and second components 252. First components 251 may allow a user to select what type of messages to receive (e.g., all reminders, reminders according to a custom schedule, all status indicators for automated remediation scripts, only initialization and/or completion indicators for automated remediation scripts, and/or other categories of messages) and/or which communication interfaces to use for the corresponding messages. Second components 252 may allow a user to configure a webhook to trigger an automated remediation script. In some implementations, the user may further specify whether authorization from the user is required before triggering the automated remediation script. One or more components of the GUI depicted in FIG. 2F may be provided in the third GUI described above in connection with FIGS. 1A-1C.

As indicated above, FIGS. 2A-2F are provided as examples. Other examples may differ from what is described with regard to FIGS. 2A-2F.

Figure 3:
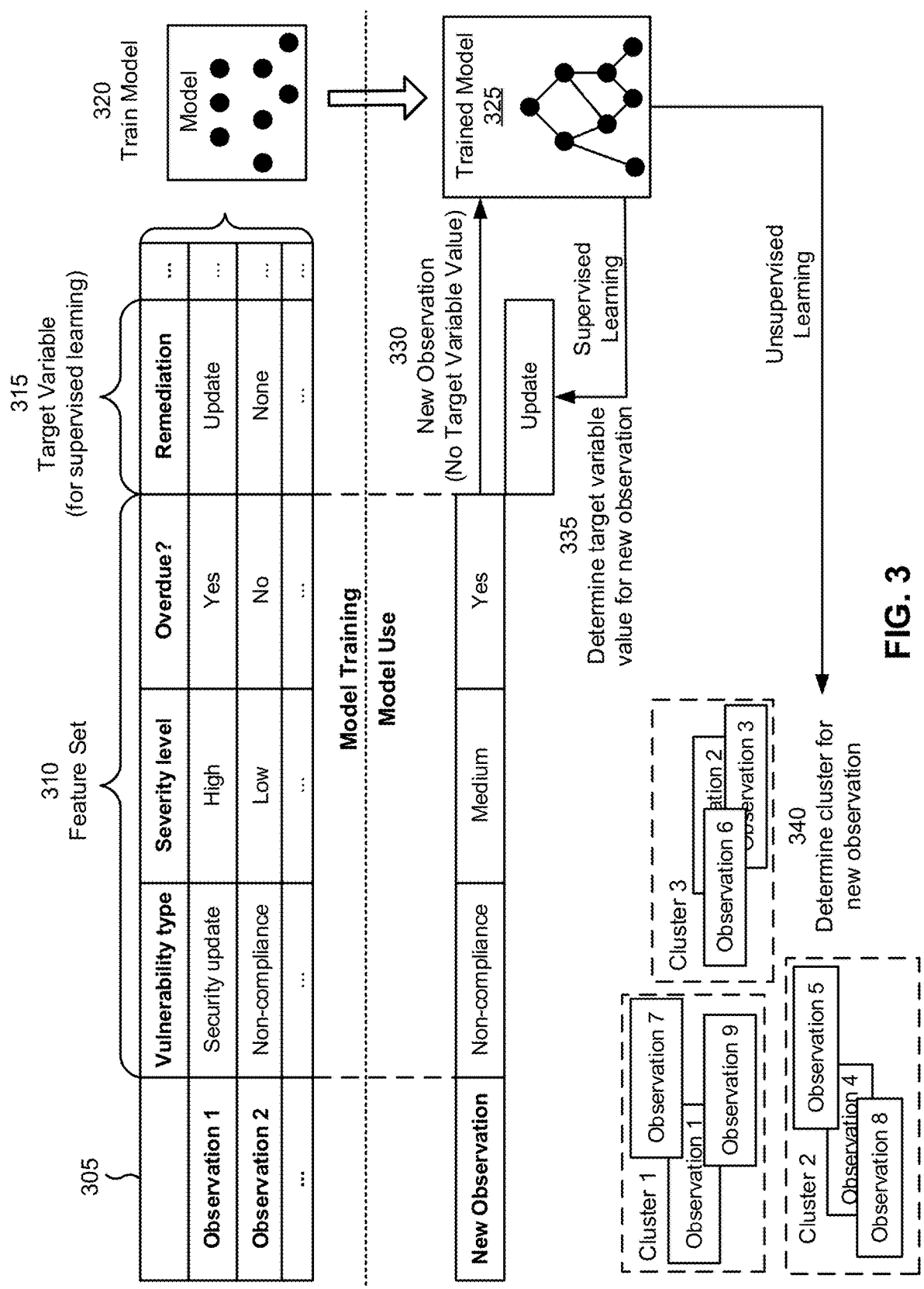
FIG. 3 is a diagram of an example of training and using a machine learning model in connection with systems and/or methods described herein.

FIG. 3 is a diagram illustrating an example 300 of training and using a machine learning model in connection with systems and/or methods described herein. The machine learning model training and usage described herein may be performed using a machine learning system. The machine learning system may include or may be included in a computing device, a server, a cloud computing environment, or the like, such as the dashboard engine described in more detail elsewhere herein.

As shown by reference number 305, a machine learning model may be trained using a set of observations. The set of observations may be obtained from training data (e.g., historical data), such as data gathered during one or more processes described herein. In some implementations, the machine learning system may receive the set of observations (e.g., as input) from one or more vulnerability databases and/or one or more cloud environments, as described elsewhere herein.

As shown by reference number 310, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the vulnerability databases and/or the cloud environments. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of vulnerability type (e.g., of a security vulnerability indicator associated with a cloud-based application), a second feature of severity level (e.g., associated with the security vulnerability indicator and/or a property associated with a cloud-based image), and a third feature of overdue status (e.g., associated with the security vulnerability indicator and/or the property), for example. As shown, for a first observation, the first feature may have a value of "security update," the second feature may have a value of "high," and the third feature may have a value of "no," for example. These features and feature values are provided as examples, and may differ in other examples. For example, the feature set may include one or more of the following features: an age and/or another property associated with a cloud-based image, a compliance indicator (e.g., associated with the cloud-based image), a due date (e.g., associated with a security vulnerability indicator and/or a property associated with a cloud-based image), and/or other similar property.

As shown by reference number 315, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 300, the target variable is a remediation recommendation, which has a value of "update" for the first observation. Accordingly, the remediation recommendation may indicate that a software update is recommended. Different remediation recommendations may be associated with different automated remediation scripts.

The feature set and target variable described above are provided as examples, and other examples may differ from what is described above. For example, for a target variable of "rehydrate," the feature set may include an overdue status of "yes" and/or an age of 45 or more associated with a cloud-based image. Accordingly, the remediation recommendation may indicate that a refresh of the cloud-based image is recommended.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 320, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 325 to be used to analyze new observations.

As shown by reference number 330, the machine learning system may apply the trained machine learning model 325 to a new observation, such as by receiving a new observation and inputting the new observation to the trained machine learning model 325. As shown, the new observation may include a first feature of "non-compliance," a second feature of "medium," and a third feature of "no," as an example. The machine learning system may apply the trained machine learning model 325 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 325 may predict a value of "update" for the target variable of remediation recommendation for the new observation, as shown by reference number 335. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, an indicator to authorize a software update for a cloud-based application associated with the target variable. The indicator may be included in a GUI (e.g., as described above in connection with FIG. 2B). The first automated action may include, for example, triggering an automated remediation script that instructs a cloud environment to perform the software update for the cloud-based application associated with the target variable.

As another example, if the machine learning system were to predict a value of "rehydrate" for the target variable of remediation recommendation, then the machine learning system may provide a second (e.g., different) recommendation (e.g., an indicator to refresh a cloud-based image associated with the target variable) and/or may perform or cause performance of a second (e.g., different) automated action (e.g., triggering an automated remediation script that instructs a cloud environment to refresh the cloud-based image associated with the target variable).

In some implementations, the trained machine learning model 325 may classify (e.g., cluster) the new observation in a cluster, as shown by reference number 340. The observations within a cluster may have a threshold degree of similarity. As an example, if the machine learning system classifies the new observation in a first cluster (e.g., associated with other similar security vulnerability indicators), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., associated with other similar properties for cloud-based images), then the machine learning system may provide a second (e.g., different) recommendation (e.g., the second recommendation described above) and/or may perform or cause performance of a second (e.g., different) automated action, such as the second automated action described above.

In some implementations, the recommendation and/or the automated action associated with the new observation may be based on a target variable value having a particular label (e.g., classification or categorization), may be based on whether a target variable value satisfies one or more thresholds (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to generating remediation recommendations for security vulnerabilities associated with cloud-based applications and/or for properties associated with cloud-based images. The machine learning system enables recognition and/or identification of tens, hundreds, thousands, or millions of features and/or feature values for tens, hundreds, thousands, or millions of observations, thereby increasing accuracy and consistency and reducing delay associated with generating remediation recommendations relative to requiring computing resources to be allocated for tens, hundreds, or thousands of operators to manually generate remediation recommendations using the features or feature values.

As indicated above, FIG. 3 is provided as an example. Other examples may differ from what is described in connection with FIG. 3.

Figure 4:
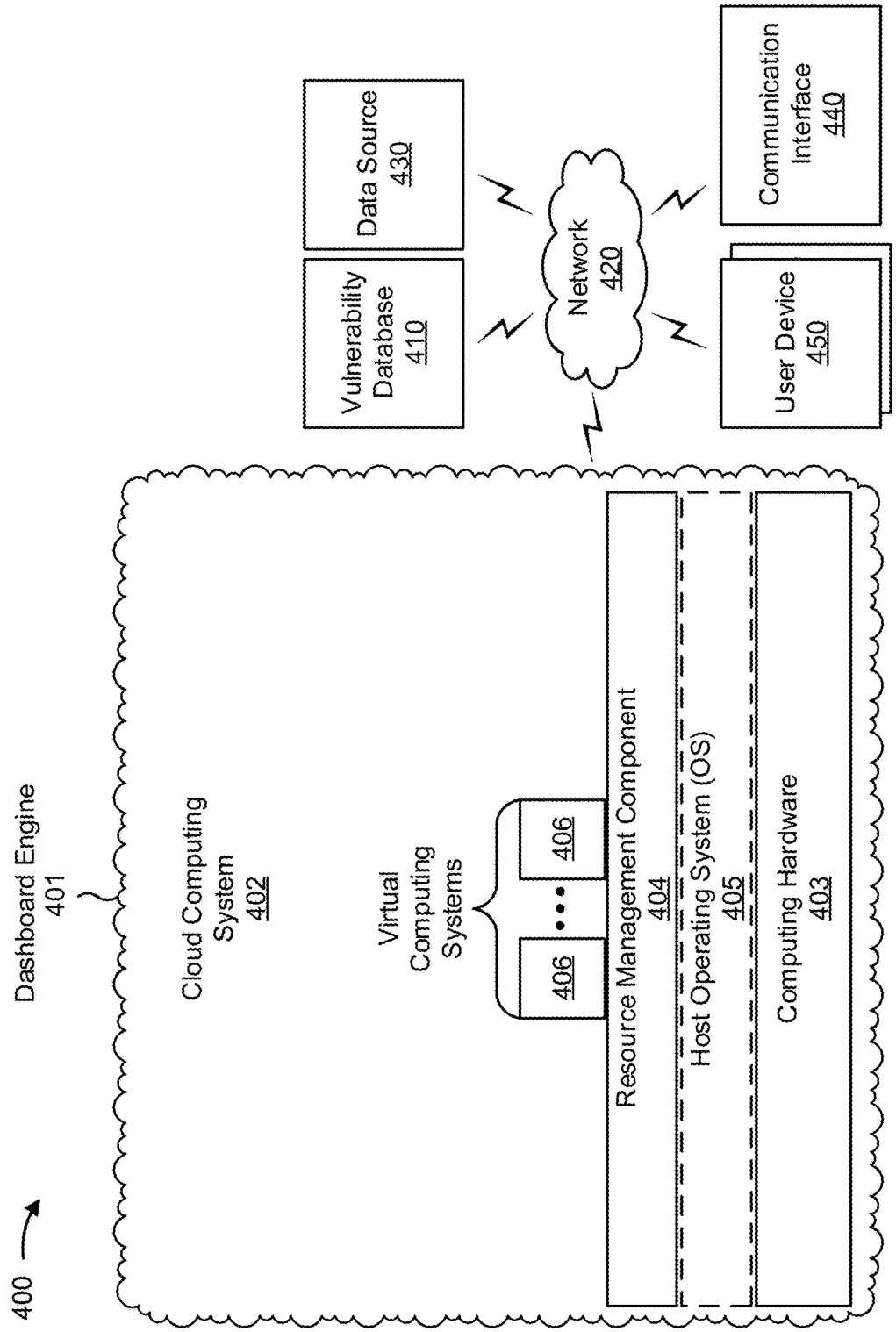
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a dashboard engine 401, which may include one or more elements of and/or may execute within a cloud computing system 402. The cloud computing system 402 may include one or more elements 403-406, as described in more detail below. As further shown in FIG. 4, environment 400 may include a vulnerability database 410, a network 420, a data source 430, a communication interface 440, and/or a user device 450. Devices and/or elements of environment 400 may interconnect via wired connections and/or wireless connections.

The cloud computing system 402 includes computing hardware 403, a resource management component 404, a host operating system (OS) 405, and/or one or more virtual computing systems 406. The resource management component 404 may perform virtualization (e.g., abstraction) of computing hardware 403 to create the one or more virtual computing systems 406. Using virtualization, the resource management component 404 enables a single computing device (e.g., a computer, a server, and/or the like) to operate like multiple computing devices, such as by creating multiple isolated virtual computing systems 406 from computing hardware 403 of the single computing device. In this way, computing hardware 403 can operate more efficiently, with lower power consumption, higher reliability, higher availability, higher utilization, greater flexibility, and lower cost than using separate computing devices.

Computing hardware 403 includes hardware and corresponding resources from one or more computing devices. For example, computing hardware 403 may include hardware from a single computing device (e.g., a single server) or from multiple computing devices (e.g., multiple servers), such as multiple computing devices in one or more data centers. Computer hardware 403 may include one or more processors, one or more memories, one or more storage components, and/or one or more networking components, examples of which are described elsewhere herein.

The resource management component 404 includes a virtualization application (e.g., executing on hardware, such as computing hardware 403) capable of virtualizing computing hardware 403 to start, stop, and/or manage one or more virtual computing systems 406. For example, the resource management component 404 may include a hypervisor (e.g., a bare-metal or Type 1 hypervisor, a hosted or Type 2 hypervisor, and/or the like) or a virtual machine monitor, such as when the virtual computing systems 406 are virtual machines. Additionally, or alternatively, the resource management component 404 may include a container manager, such as when the virtual computing systems 406 are containers. In some implementations, the resource management component 404 executes within and/or in coordination with a host operating system 405.

A virtual computing system 406 includes a virtual environment that enables cloud-based execution of operations and/or processes described herein using computing hardware 403. A virtual computing system 406 may execute one or more applications using a file system that includes binary files, software libraries, and/or other resources required to execute applications on a guest operating system (e.g., within the virtual computing system 406) or the host operating system 405.

Although the dashboard engine 401 may include one or more elements 403-406 of the cloud computing system 402, may execute within the cloud computing system 402, and/or may be hosted within the cloud computing system 402, in some implementations, the dashboard engine 401 may not be cloud-based (e.g., may be implemented outside of a cloud computing system) or may be partially cloud-based. For example, the dashboard engine 401 may include one or more devices that are not part of the cloud computing system 402, such as device 500 of FIG. 5, which may include a standalone server or another type of computing device. The dashboard engine 401 may perform one or more operations and/or processes described in more detail elsewhere herein.

Vulnerability database 410 may be implemented on a cloud computing system at least partially integrated with cloud computing system 402 (e.g., as computing hardware 403) or distinct from cloud computing system 402 (e.g., as a standalone server). In some implementations, the vulnerability database 410 may include one or more devices (e.g., one or more servers) that are not part of a cloud computing system, such as device 500 of FIG. 5, which may include a standalone server or another type of computing device. The vulnerability database 410 may store information regarding security vulnerabilities, as described elsewhere herein.

Network 420 includes one or more wired and/or wireless networks. For example, network 420 may include a cellular network, a public land mobile network (PLMN), a local area network (LAN), a wide area network (WAN), a private network, the Internet, and/or the like, and/or a combination of these or other types of networks. The network 420 enables communication among the devices of environment 400.

Data source 430 may be implemented on a cloud computing system at least partially integrated with cloud computing system 402 (e.g., as computing hardware 403) or distinct from cloud computing system 402 (e.g., as a standalone server). In some implementations, the data source 430 may include one or more devices (e.g., one or more servers) that are not part of a cloud computing system, such as device 500 of FIG. 5, which may include a standalone server or another type of computing device. The data source 430 may store news articles, as described elsewhere herein.

Communication interface 440 may be implemented on a cloud computing system at least partially integrated with cloud computing system 402 (e.g., as computing hardware 403) or distinct from cloud computing system 402 (e.g., as a standalone server). In some implementations, the communication interface 440 may include one or more devices (e.g., one or more servers) that are not part of a cloud computing system, such as device 500 of FIG. 5, which may include a standalone server or another type of computing device. The communication interface 440 may deliver messages regarding security vulnerability indicators and/or regarding properties associated with cloud-based images, to user devices, based on instructions from the dashboard engine 401, as described elsewhere herein.

User device 450 may include one or more devices capable of receiving GUIs and/or messages regarding security vulnerability indicators and/or regarding properties associated with cloud-based images. The user device 450 may include a communication device. For example, the user device 450 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The user device 450 may communicate with the dashboard engine 401 based on interaction with the GUIs and/or the communications. Additionally, or alternatively, the user device 450 may transmit confirmation of a remediation recommendation to trigger the dashboard engine 401 to execute an automated remediation script, as described elsewhere herein.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
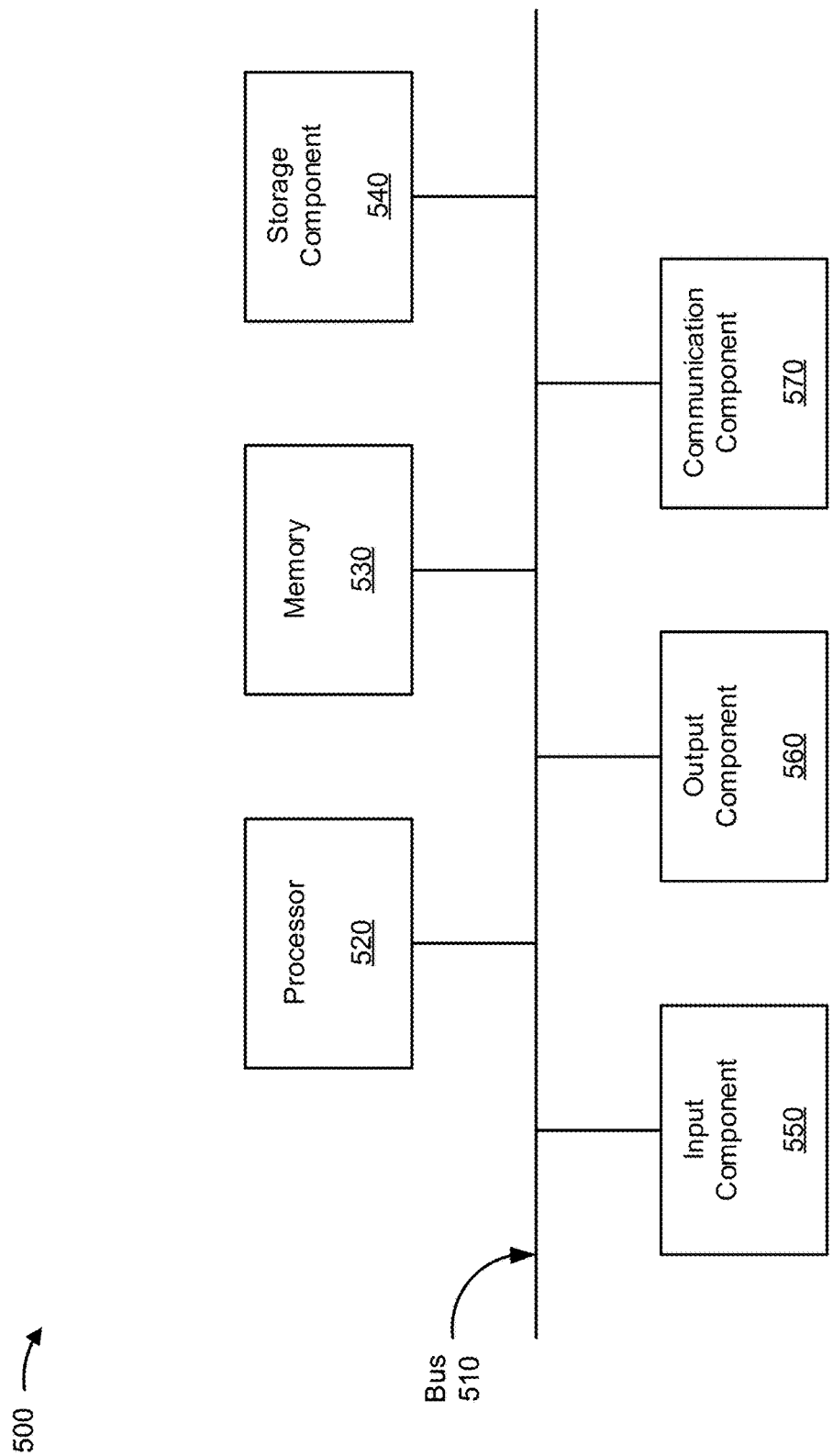
FIG. 5 is a diagram of example components of one or more devices of FIG. 4.

FIG. 5 is a diagram of example components of a device 500, which may correspond to a vulnerability database, a data source, a communication interface, and/or a user device. In some implementations, a vulnerability database, a data source, a communication interface, and/or a user device may include one or more devices 500 and/or one or more components of device 500. As shown in FIG. 5, device 500 may include a bus 510, a processor 520, a memory 530, a storage component 540, an input component 550, an output component 560, and a communication component 570.

Bus 510 includes a component that enables wired and/or wireless communication among the components of device 500. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform a function. Memory 530 includes a random access memory, a read only memory, and/or another type of memory (e.g., a flash memory, a magnetic memory, and/or an optical memory).

Storage component 540 stores information and/or software related to the operation of device 500. For example, storage component 540 may include a hard disk drive, a magnetic disk drive, an optical disk drive, a solid state disk drive, a compact disc, a digital versatile disc, and/or another type of non-transitory computer-readable medium. Input component 550 enables device 500 to receive input, such as user input and/or sensed inputs. For example, input component 550 may include a touch screen, a keyboard, a keypad, a mouse, a button, a microphone, a switch, a sensor, a global positioning system component, an accelerometer, a gyroscope, and/or an actuator. Output component 560 enables device 500 to provide output, such as via a display, a speaker, and/or one or more light-emitting diodes. Communication component 570 enables device 500 to communicate with other devices, such as via a wired connection and/or a wireless connection. For example, communication component 570 may include a receiver, a transmitter, a transceiver, a modem, a network interface card, and/or an antenna.

Device 500 may perform one or more processes described herein. For example, a non-transitory computer-readable medium (e.g., memory 530 and/or storage component 540) may store a set of instructions (e.g., one or more instructions, code, software code, and/or program code) for execution by processor 520. Processor 520 may execute the set of instructions to perform one or more processes described herein. In some implementations, execution of the set of instructions, by one or more processors 520, causes the one or more processors 520 and/or the device 500 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
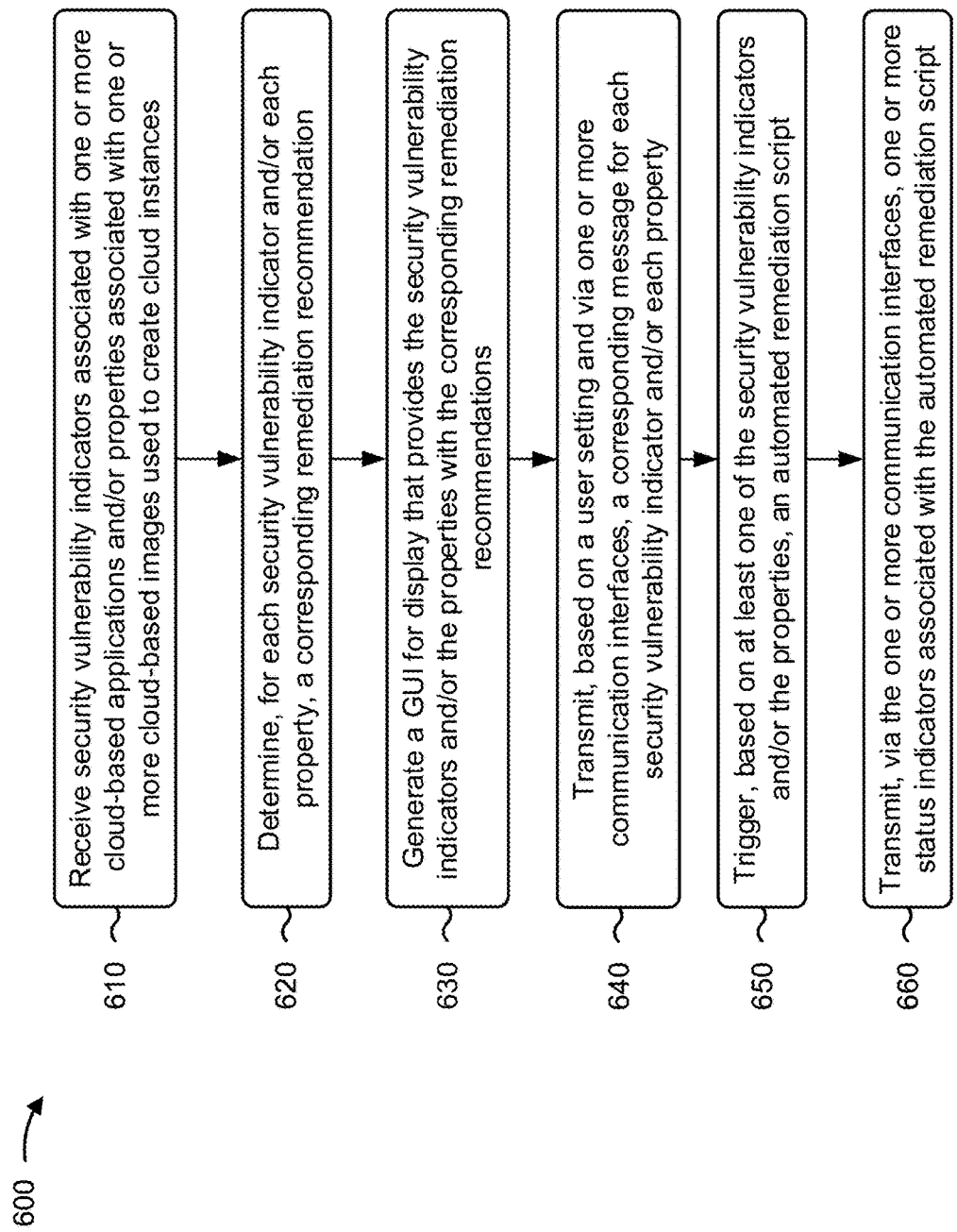
FIG. 6 is a flowchart of an example process relating to a dashboard display of, and automated communications and remediation for, security vulnerabilities.

FIG. 6 is a flowchart of an example process 600 associated with vulnerability dashboard and automated remediation. In some implementations, one or more process blocks of FIG. 6 may be performed by a system (e.g., dashboard engine 401). In some implementations, one or more process blocks of FIG. 6 may be performed by another device or a group of devices separate from or including the system, such as a vulnerability database 410, data source 430, communication interface 440, and/or user device 450. Additionally, or alternatively, one or more process blocks of FIG. 6 may be performed by one or more components of device 500, such as processor 520, memory 530, storage component 540, input component 550, output component 560, and/or communication component 570.

As shown in FIG. 6, process 600 may include receiving, from a database that stores information regarding security vulnerabilities, security vulnerability indicators associated with one or more cloud-based applications and/or receiving, from a cloud environment, properties associated with one or more cloud-based images used to create cloud instances (block 610). As further shown in FIG. 6, process 600 may include determining, for each security vulnerability indicator and/or each property, a corresponding remediation recommendation (block 620). As further shown in FIG. 6, process 600 may include generating a GUI for display (block 630). In some implementations, the GUI provides the security vulnerability indicators and/or the properties with the corresponding remediation recommendations. As further shown in FIG. 6, process 600 may include transmitting, based on a user setting and via one or more communication interfaces, a corresponding message for each security vulnerability indicator and/or each property (block 640). As further shown in FIG. 6, process 600 may include triggering, based on at least one of the security vulnerability indicators and/or the properties, an automated remediation script (block 650). In some implementations, the automated remediation script instructs the cloud environment to perform an action for a cloud-based application associated with the at least one of the security vulnerability indicators and/or to perform an action for a cloud-based image associated with the at least one of the properties. As further shown in FIG. 6, process 600 may include transmitting, via the one or more communication interfaces, one or more status indicators associated with the automated remediation script (block 660).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for a dashboard display of and automated communications and remediation for security vulnerabilities, the system comprising:
   one or more memories; and
   one or more processors, communicatively coupled to the one or more memories, configured to:
     receive, from a database that stores information regarding security vulnerabilities, security vulnerability indicators associated with one or more cloud-based applications;
     obtain a set of properties associated with one or more cloud-based images used to create cloud instances;
     determine, for each security vulnerability indicator, a corresponding remediation recommendation;
     generate a first graphical user interface (GUI) for display, wherein the first GUI provides:
       a plurality of categories,
         wherein a category, of the plurality of categories, corresponds to a property of the set of properties associated with the one or more cloud-based images used to create the cloud instances, and
       for each of the plurality of categories, a plurality of groups having different security levels,
         wherein each group includes a subset of the security vulnerability indicators, and
         wherein each group is distinguished in the first GUI using spatial separation, color indicators, or a combination thereof;
     generate, based on interaction with one of the plurality of groups, a second GUI for display, wherein the second GUI provides a selected subset of the security vulnerability indicators with corresponding remediation recommendations,
       wherein the second GUI includes one or more indicators that indicate whether the cloud-based images satisfy one or more security conditions;
     transmit, based on a user setting and via one or more communication interfaces, a corresponding message for each security vulnerability indicator;
     trigger, for at least one of the security vulnerability indicators, an automated remediation script based on a corresponding one of the remediation recommendations, wherein the automated remediation script instructs a cloud environment to perform an action for a cloud-based application associated with the at least one of the security vulnerability indicators; and
     transmit, via the one or more communication interfaces, one or more status indicators associated with the automated remediation script,
       wherein the one or more processors, when transmitting the one or more status indicators, are configured to:

transmit, via the one or more communication interfaces, one or more initialization indicators associated with triggering the automated remediation script; and
transmit, via the one or more communication interfaces, one or more completion indicators when the automated remediation script is finished.

2. The system of claim 1, wherein the one or more processors, when triggering the automated remediation script, are configured to:
call an application programming interface (API), using a webhook, to trigger the automated remediation script; and
wherein the webhook is configured based on another user setting.

3. The system of claim 1, wherein the one or more processors are further configured to:
receive a confirmation based on an interaction with the second GUI or an interaction with a corresponding one of the messages; and
wherein the automated remediation script is triggered based on the confirmation.

4. The system of claim 1, wherein the one or more processors, when transmitting the corresponding message for each security vulnerability indicator, are configured to:
determine, based on the user setting, the one or more communication interfaces; and
communicate with one or more servers associated with the one or more communication interfaces to transmit the corresponding message to the user.

5. The system of claim 1, wherein the one or more processors, when determining, for each security vulnerability indicator, the corresponding remediation recommendation, are configured to:
determine, for each security vulnerability indicator, the corresponding remediation recommendation based on output from a remediation engine; and
wherein the remediation engine is a trained machine learning model.

6. The system of claim 1, wherein the one or more processors are further configured to:
determine, for each security vulnerability indicator, a corresponding due date; and
wherein the second GUI further provides the selected subset of the security vulnerability indicators with corresponding due dates.

7. A method of generating a dashboard display of and automated communications and remediation for security vulnerabilities, comprising:
receiving, from a cloud environment, properties associated with one or more cloud-based images used to create cloud instances;
determining, for each property, a corresponding remediation recommendation;
generating a first graphical user interface (GUI) for display, wherein the first GUI provides:
a plurality of categories, and
for each of the plurality of categories, a plurality of groups having different severity levels,
wherein each group includes a subset of the properties, and
wherein each group is distinguished in the first GUI using spatial separation, color indicators, or a combination thereof;
generating, based on interaction with one of the plurality of groups, a second GUI for display, wherein the second GUI provides a selected subset of the properties with the corresponding remediation recommendations, wherein the second GUI includes one or more indicators that indicate whether the cloud-based images satisfy one or more security conditions;
transmitting, based on a user setting and via one or more communication interfaces, a corresponding message for each property;
triggering, based on at least one of the properties, an automated remediation script, wherein the automated remediation script instructs the cloud environment to perform an action for a cloud-based image associated with the at least one of the properties; and
transmitting, via the one or more communication interfaces, one or more status indicators associated with the automated remediation script,
wherein transmitting the one or more status indicators comprises:
transmitting, via the one or more communication interfaces, one or more initialization indicators associated with triggering the automated remediation script; and
transmitting, via the one or more communication interfaces, one or more completion indicators when the automated remediation script is finished.

8. The method of claim 7, further comprising:
determining, for each property, one or more corresponding compliance indicators based on one or more compliance rules; and
wherein the second GUI includes a table indicating the properties with the corresponding compliance indicators.

9. The method of claim 7, wherein the second GUI further provides at least one graph associated with the properties grouped by corresponding severity levels.

10. The method of claim 7, wherein transmitting the corresponding message for each property comprises:
determining, based on the user setting, the one or more communication interfaces; and
wherein transmitting each corresponding message is based on the corresponding property satisfying at least one condition.

11. The method of claim 7, wherein determining, for each property, the corresponding remediation recommendation, comprises:
determining, for each property, the corresponding remediation recommendation based on output from a remediation engine; and
wherein the remediation engine is a trained machine learning model.

12. The method of claim 7, further comprising:
determining, for each property, a corresponding due date; and
wherein the second GUI further provides the selected subset of the properties with corresponding due dates.

13. A non-transitory computer-readable medium storing a set of instructions for generating graphical user interfaces (GUIs) about and transmitting automated communications for security vulnerabilities, the set of instructions comprising:
one or more instructions that, when executed by one or more processors of a device, cause the device to:
receive, from a database that stores information regarding security vulnerabilities, security vulnerability indicators associated with one or more cloud-based applications;

obtain a set of properties associated with one or more cloud-based images used to create cloud instances;

determine, for each security vulnerability indicator, a corresponding remediation recommendation;

generate a first GUI for display, wherein the first GUI provides:
  a plurality of categories,
    wherein a category, of the plurality of categories, corresponds to a property of the set of properties associated with the one or more cloud-based images used to create the cloud instances, and
  for each of the plurality of categories, a plurality of groups having different severity levels,
    wherein each group includes a subset of the security vulnerability indicators, and
    wherein each group is distinguished in the first GUI using a combination of spatial separation and color indicators;

transmit, based on a user setting and via one or more communication interfaces, a corresponding message for each security vulnerability indicator;

receive, based on interaction with the first GUI, a request to provide more details about a subset of the security vulnerability indicators;

generate a second GUI for display based on the request, wherein the second GUI provides the subset of the security vulnerability indicators with corresponding remediation recommendations,
  wherein the second GUI includes one or more indicators that indicate whether the cloud-based images satisfy one or more security conditions, trigger, based on the at least one of the set of properties, an automated remediation script that instructs a cloud environment, associated with the one or more cloud-based applications, to perform an action for the cloud-based image associated with the at least one of the set of properties; and transmit one or more status indicators associated with the automated remediation script,
  wherein transmitting the one or more status indicators comprises:
    transmitting, via the one or more communication interfaces, one or more initialization indicators associated with triggering the automated remediation script; and
    transmitting, via the one or more communication interfaces, one or more completion indicators when the automated remediation script is finished.

14. The non-transitory computer-readable medium of claim 13, wherein the first GUI provides a plurality of boxes, of differing colors, that indicate the security vulnerability indicators grouped by corresponding severity levels, and wherein the interaction with the first GUI comprises an interaction with one of the plurality of boxes.

15. The non-transitory computer-readable medium of claim 13, wherein the second GUI provides a table indicating the subset of the security vulnerability indicators with the corresponding remediation recommendations.

16. The non-transitory computer-readable medium of claim 13, wherein the one or more instructions further cause the device to:
  receive, from one or more data sources, one or more news articles associated with the security vulnerability indicators; and
  wherein the second GUI provides the one or more news articles.

17. The non-transitory computer-readable medium of claim 13, wherein the one or more instructions further cause the device to:
  determine, for each security vulnerability indicator, a corresponding due date; and
  wherein the second GUI further provides the subset of the security vulnerability indicators with corresponding due dates.

18. The non-transitory computer-readable medium of claim 15, wherein the one or more instructions further cause the device to:
  receive, based on interaction with a third GUI, an indication of the one or more communication interfaces; and
  receive, based on the interaction with the third GUI, the user setting.

19. The system of claim 1, wherein the one or more processors are further configured to:
  receive, based on an interaction with a third GUI, the user setting.

20. The method of claim 7, further comprising:
  receiving, based on an interaction with a third GUI, the user setting.

* * * * *